United States Patent [19]
Zobel

[11] Patent Number: 4,723,843
[45] Date of Patent: Feb. 9, 1988

[54] ENDOSCOPE OPTICAL SYSTEM

[75] Inventor: Jürgen Zobel, Bretten-Sprantal, Fed. Rep. of Germany

[73] Assignee: Richard Wolf GmbH, Fed. Rep. of Germany

[21] Appl. No.: 866,965

[22] Filed: May 27, 1986

[30] Foreign Application Priority Data

Jul. 31, 1985 [DE] Fed. Rep. of Germany ....... 3527393

[51] Int. Cl.$^4$ .......................... G02B 6/32; G02B 6/18; G02B 3/00
[52] U.S. Cl. ................................ 350/573; 350/96.18; 350/96.31; 350/413
[58] Field of Search ............... 350/96.18, 96.26, 96.31, 350/413, 573; 128/4, 5, 6, 7, 8, 9, 10

[56] References Cited

U.S. PATENT DOCUMENTS

| | | | |
|---|---|---|---|
| 4,148,551 | 4/1979 | MacAnally | 350/573 |
| 4,501,477 | 2/1985 | Sunaga | 350/96.26 |
| 4,641,927 | 2/1987 | Prescott et al. | 350/96.31 |

OTHER PUBLICATIONS

International Fiber Optics and Communication, vol. 3, No. 2, entitled "Selfoc Graded Index Lenses, Mar.-/Apr. 1982, p. 51.
Applied Optics, vol. 11, No. 4, pp. 946-947, Apr. 1972, entitled "Scanning a Temoo Mode Laser Beam through Selfoc Fibers", A. Rosen.
Camera International, No. 4, Apr. 1965, pp. 36-37.

Primary Examiner—Bruce Y. Arnold
Assistant Examiner—Vincent J. Lemmo

[57] ABSTRACT

An endoscope optical system comprising rod lenses between the objective and ocular lenses has the feature that gradient rod lenses, whose lengths each end centrally between two intermediate images, are installed with small spacings between the ocular and objective lenses. To this end, the rod lenses terminate centrally between two intermediate images and the distal and proximal gradient rod lenses have no more than half the length of the spacing between said intermediate images.

8 Claims, 5 Drawing Figures

ENDOSCOPE OPTICAL SYSTEM

BACKGROUND OF THE INVENTION

The invention relates to an endoscope optical system comprising an objective and an ocular lens and intermediate rod lenses, with an optional number of intermediate images.

DESCRIPTION OF THE PRIOR ART

Endoscope optical system of aforesaid kind, e.g. according to German Pat. No. 2,305,473 have the advantage thanks to their structure, that the number of glass-air interfaces is reduced considerably and that the light losses are kept to a minimum thereby.

It is also known that a single thin rod lens through which the light beams pass under sinusoidal curvature may be utilised in endoscopes as a gradient rod lens, to considerable advantage. Such single rod lenses are very liable to break and repairs involve considerable expense and longer stoppage periods in the utilisation of the endoscope.

SUMMARY OF THE INVENTION

It is an object of the invention to modify and construct endoscopes comprising single thin gradient rod lenses in such manner as to prevent breakages.

In an endoscope according to the invention, this object is achieved in that an image transmitter comprising single essentially known gradient rod lenses which are set at minimum distances and whose lengths terminate between two intermediate images, is situated between the ocular and objective lenses.

Breakages of the optical system comprising gradient rod lenses are eliminated thanks to this solution, since the spacing span between two gradient rod lenses in each case may be shifted to the points at which flexure or breaking stresses may occur. This is possible because the lengths of the individual rods may be selected freely as a function of the individual spacings between the intermediate images. It is particularly advantageous however if the lengths of the gradient rods are equal to that of the intermediate image spacing and the gradient rod lenses terminate centrally between two intermediate images, whereas the proximal and distal gradient rod lenses have a length corresponding to no more than half the distance between two intermediate images.

The maximum amplitudes of the sinusoidally extending beams are thereby placed in the spacing span between two gradient rod lenses in each case, i.e. the beams have their greatest divergency at these points, so that any dust particles or the like which may be present disturb the image as a whole to a minimum extent for this reason.

Furthermore, the solution according to the invention may be applied in the case of repairs of endoscope optical systems comprising a single thin broken gradient rod lens, because it is then possible to shorten the dimensions of the two broken pieces in such manner that a single gradient rod lens may be inserted between the two broken pieces whilst re-establishing the original length. To this end, the ends of the broken pieces which are ground plane, may be bonded to the intermediate rod or a small gap may be provided.

The invention is described in particular in the following with reference to the accompanying drawings, in which preferred embodiments of the invention are diagramatically illustrated.

DETAILED DESCRIPTION OF THE PREFERRED EMBODIMENTS

Figure 1:
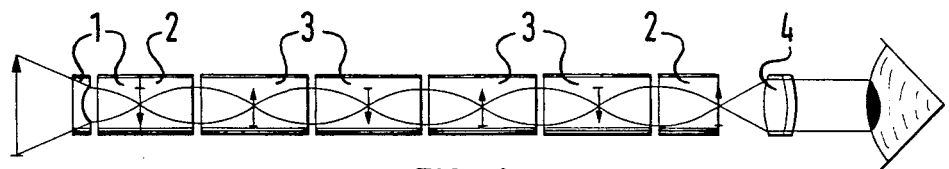
FIG. 1 shows the diagrammatically illustrated structure of an endoscope optical system according to the invention.
Figure 2:
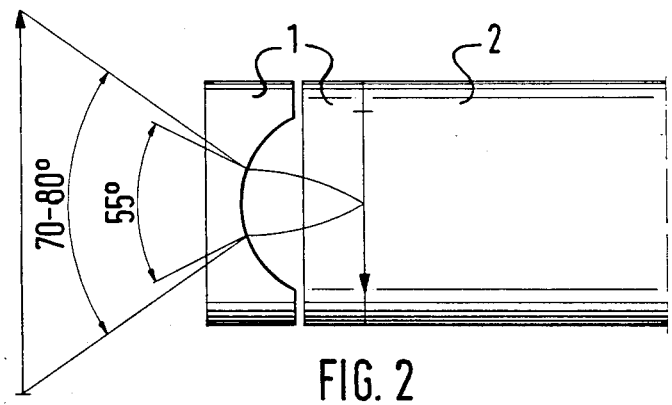
FIG. 2 is an enlarged view of the distal section of the endoscope optical system of FIG. 1.
Figure 3:
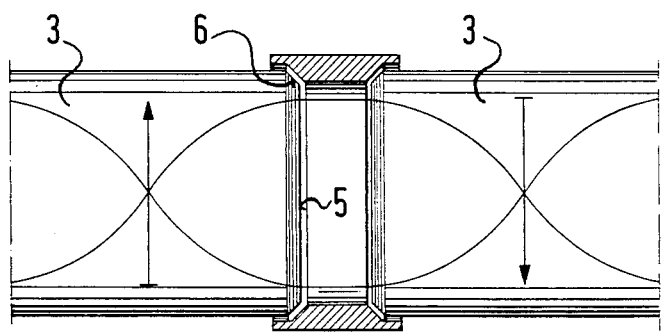
FIG. 3 shows a part length of the optical system of FIG. 1 with two gradient rod lenses which are to be strung together, and FIGS. 4 and 5 respectively show the ocular section of the gradient rod lens optical system with two different constructions of the proximal gradient rod lens.

The endoscope optical system according to the invention comprises an objective lens 1 which is bonded to a first gradient rod lens 2, and a number of single subsequent gradient rod lenses 3, with a terminal ocular lens 4. The rods lenses are strung together in loose form, with a small spacing. The lengths of the individual gradient rod lenses 3 may be selected freely as a function of the individual intermediate image spacings. It is advantageous however to adapt the lengths of the gradient rod lenses to the intermediate image spacing, so that the separation between every two adjacent rod lenses is centrally situated between two intermediate images with optimum precision, since the beams arriving from an image dot then have the greatest amplitude of the sinusoidal beam course, or rather the greatest divergence. The image as a whole thereby incurs minimum percentage interference from possible dust particles or the like. Apart from the identical lengths of the gradient rod lenses 3, the length of the gradient rod lens 2 at the distal and proximal extremities should be selected as being no more than half the spacing of two intermediate images.

If there are points along the length of the endoscope optical system which are particularly vulnerable to breakage, the points of separation between the individual gradient rod lenses may be situated at these points, that is to say thanks to the fact that the rod lengths are selected under consideration of the laws of optics.

It is appropriate furthermore to upgrade the end faces 5 of the gradient rod lenses by application of thin coatings, to reduce reflection. Furthermore, the marginal edges 6 of the end faces 5 are produced in facet-like form, to prevent breaking off of the gradient rods, and it is advantageous to finally close off the spacing between two rod lenses by an annular joint in each case, to prevent precipitations of dust particles on the end faces 5.

Figure 4:
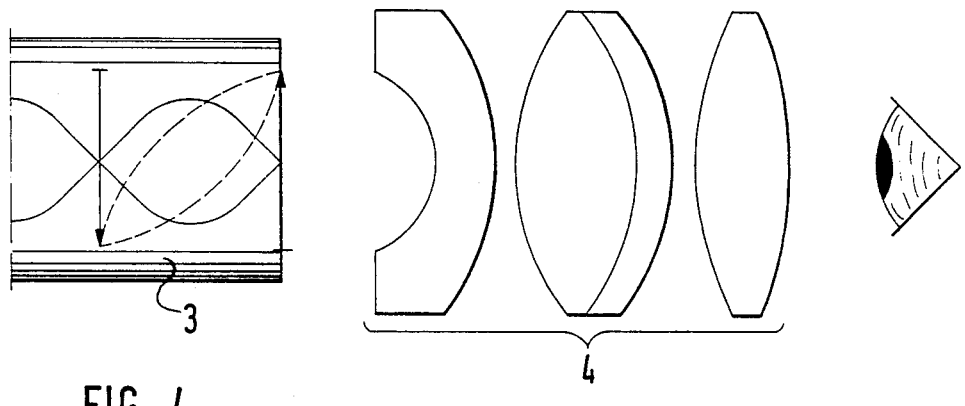
Figure 5:
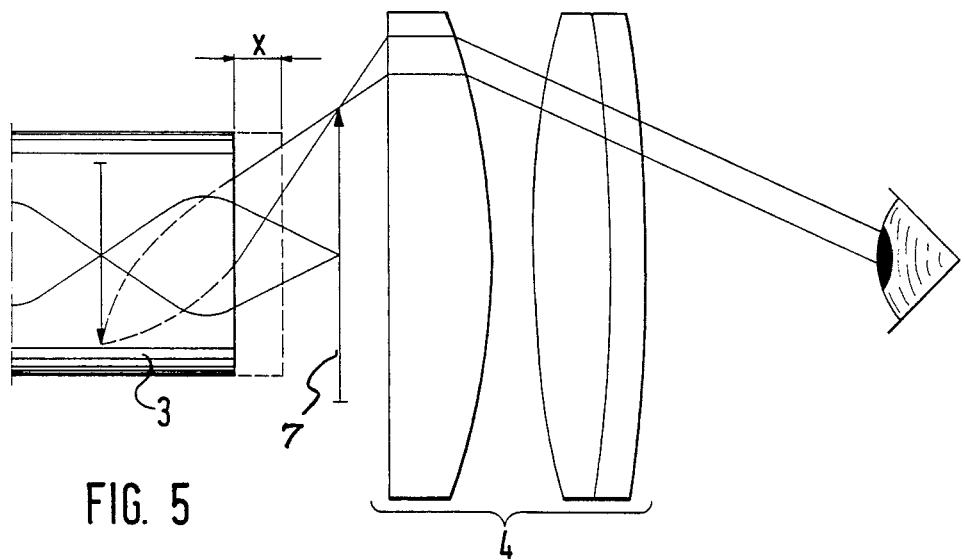

If the length of the gradient rod lengths is matched to the spacing between two intermediate images and the points of separation lie centrally within an intermediate image spacing and if the overall length of the rod length 2 and 3 is equal to the overall length of the intermediate image spacings, the final intermediate image 7 is generated at the extremity of the last proximal rod lens, according to FIG. 4. If the overall length of the rod lenses is smaller than an integral multiple of the intermediate image spacing, the last proximal intermediate image is generated in enlarged form behind the last proximal rod lens 3. If this embodiment according to FIG. 5 is selected, the ocular lens 4 may be constructed in simplified and thus less costly form, corresponding to the image magnification by means of the rod lens optical system.

If the diameter of the gradient rod lenses 3 is chosen comparatively small, the image angle of conventional objective lenses is commonly too small. According to FIG. 1, the objective 1 may be constructed as a negative lens, a meniscus lens or a planoconcave lens, so that the angular field may thereby be enlarged to 70° to 80°, for example.

I claim:

1. An endoscope optical system comprising an objective lens, an ocular lens and an image transmitter, comprising interposed rod lenses therebetween forming a plurality of intermediate images, wherein said image transmitter comprises a series of aligned individual gradient rod lenses which are positioned with minimal spacing between them and whose lengths each terminate between two said intermediate images.

2. An endoscope optical system as claimed in claim 1, wherein the lengths of intermediate gradient rod lenses in said series is equal to that of the spacing between said intermediate images, wherein said intermediate gradient rod lenses terminate centrally between two said intermediate images, and wherein the gradient rod lenses at the proximal and distal ends of said series have no more than half the length of said intermediate image spacing.

3. An endoscope optical system as claimed in claim 1, wherein said gradient rod lenses have end faces with marginal edges which are provided with a facet and wherein the space between each two adjacent gradient rod lenses is closed off by a ring mounting.

4. An endoscope optical system as claimed in claim 1, wherein an enlarged final intermediate image is formed outside the last proximal gradient rod lens nearest said ocular lens:

5. An endoscope optical system comprising an objective lens, an ocular lens and an image transmitter, said image transmitter forming a plurality of intermediate images and being interposed between the objective lens and ocular lens, said image transmitter comprising a series of aligned individual gradient rod lenses being positioned with minimal spacing therebetween, said series including a proximal rod lens, a distal rod lens and a plurality of intermediate rod lenses, each of the rod lenses having a length less than the distance between two intermediate images.

6. An endoscope optical system according to claim 5, wherein the proximal gradient rod lens of the series has a length less than half of the intermediate image spacing so that an enlarged, final intermediate image is formed thereby, said ocular lens being constructed to receive this enlarged final intermediate image.

7. An endoscope optical system as claimed in claim 5, wherein the length of the intermediate gradient rod lens in said series is equal to that of the spacing between said intermediate images, said intermediate gradient rod lenses terminating centrally between two intermediate images, and the proximal and distal gradient rod lenses having a length of no more than half the length of said intermediate image spacing.

8. An endoscope optical system comprising an objective lens, an ocular lens and an image transmitter, which form a plurality of intermediate images, being interposed between said objective lens and ocular lens, said image transmitter being a series of aligned individual gradient rod lenses which have end faces with marginal edges which are provided with facets, each of said rod lenses having a length to terminate between two intermediate images and each space between two adjacent gradient rod lenses being closed off by a ring mounting.

* * * * *